(12) United States Patent
Huffman (10) Patent No.: US 7,006,696 B2
(45) Date of Patent: Feb. 28, 2006

(54) METHODS AND APPARATUS FOR COMPRESSION OF TRANSFORM DATA

(75) Inventor: John C. Huffman, Menlo Park, CA (US)

(73) Assignee: Stentor Inc., Brisbaine, CA (US)

( * ) Notice: Subject to any disclaimer, the term of this patent is extended or adjusted under 35 U.S.C. 154(b) by 158 days.

(21) Appl. No.: 10/400,829

(22) Filed: Mar. 27, 2003

(65) Prior Publication Data

US 2004/0005094 A1 Jan. 8, 2004

Related U.S. Application Data

(63) Continuation of application No. 09/489,457, filed on Jan. 21, 2000, now Pat. No. 6,553,141.

(51) Int. Cl.
*G06K 9/36* (2006.01)
*G06K 15/16* (2006.01)

(52) U.S. Cl. .................................. 382/232; 709/247

(58) Field of Classification Search ........ 382/232–233, 382/240, 244–348, 399; 348/399
See application file for complete search history.

(56) References Cited

U.S. PATENT DOCUMENTS

| 5,539,658 | A | 7/1996 | McCullough |
| 5,621,660 | A | 4/1997 | Chaddha et al. |
| 5,710,835 | A | 1/1998 | Bradley |
| 6,085,221 | A | 7/2000 | Graf |
| 6,553,141 | B1 * | 4/2003 | Huffman ................ 382/232 |

FOREIGN PATENT DOCUMENTS

| EP | 0 701 375 A2 | 8/1994 |
| EP | 0 669 765 A2 | 8/1995 |

OTHER PUBLICATIONS

Richard L. Phillips, "A Bridge from Full-Function to Reduced- Function Workstations", I.E.E.E. Computer Graphics and Application 6, May (1986) NY, NY.

* cited by examiner

*Primary Examiner*—Bhavesh M. Mehta
*Assistant Examiner*—Duy M. Dang
(74) *Attorney, Agent, or Firm*—John Vodopia (57) ABSTRACT

A compression technique, for use in a network environment, compresses transform data to improve transmission rates in low bandwidth applications. The source data is decomposed into transform data that consists of spatially related coefficients. In a client-server environment, a client issues a request, which defines a block of the coefficients and at least one quantization value, for source data. In response to the client request, the server extracts transform data defined by the request. The transform data is quantized, in accordance with the quantization value, and is compressed to generate compressed data. The server transfers the compressed data to the client. The client decompresses the compressed data to obtain quantized data, and de-quantizes the quantized data to recover the transform data. The client then reconstructs the original source data from the transform data. Techniques for transmitting to the client incremental data, for use in conjunction with cached data, is disclosed. The use of the compression techniques for images in a medical informatics system is also disclosed.

10 Claims, 9 Drawing Sheets

METHODS AND APPARATUS FOR COMPRESSION OF TRANSFORM DATA

This application is a continuation application of U.S. patent application Ser. No. 09/489,457, entitled "Methods and Apparatus for Compression of Transform Data" filed on Jan. 21, 2000, now U.S. Pat. No. 6,553,141.

BACKGROUND OF THE INVENTION

1. Field of the Invention

The present invention is directed toward the field of data transfer, and more particularly toward compressing transform data for efficient distribution across a network.

2. Art Background

It has become more common for images to be stored, distributed, and viewed in digital form using computer technology. In the medical field Picture Archival and Communication Systems or PACS have been in widespread use. In a typical PACS application, image data obtained by imaging equipment, such as CT scanners or MRI scanners, is stored in the form of computer data files. The size of a data file for an image varies depending on the size and resolution of the image. For example, a typical image file for a diagnostic-quality chest X-ray is on the order of 10 megabytes (MB). The image data files are usually formatted in a "standard" or widely accepted format. In the medical field, one widely used image format is known as DICOM. The DICOM image data files are distributed over computer networks to specialized viewing stations capable of converting the image data to high-resolution images on a CRT display.

In imaging applications, it is important to display images at a high resolution. For example, in the medical imaging application, images require display at high resolution so that image details having potential diagnostic significance are visible. Also, in the medical imaging application, concurrent viewing of multiple images, captured over time, is desirable in order to enable the detection of changes that occur over a time period. The need for high resolution and multiple views translates into a need for high network bandwidth, large storage capacity, and significant processing power at the viewing stations. The traditional digitally encoded medical images, used in medical applications, usually require powerful and expensive computer systems to archive, distribute, manipulate, and display the medical images. Consequently, many current imaging systems, such as PACS, are very expensive. Because of this, a medical center having a PACS may have only a few image viewing stations, used primarily by specialists, such as radiologists.

A technique for distributing large images over a network, such as medical images, has been developed by Dr. Paul Chang, M.D., and Carlos Bentancourt at the University of Pittsburgh. This technique, referred to as dynamic transfer syntax, operates in a client-server environment to deliver, from the server to the client, image data as the image data is needed at the client (i.e., a just in time data delivery mechanism). To implement this "just in time" data delivery mechanism, the dynamic transfer syntax generates a flexible hierarchical representation of an image for storage at the server. The hierarchical representation consists of coefficients produced by a wavelet transform. To view portions of the image at the client, the client issues requests for data that include coefficient coordinates to identify coefficients in the hierarchical representation. The client then reconstructs the portion of the image, at the client, from the transform data requested. A complete description of the dynamic transfer syntax is contained in U.S. Provisional Patent Application, entitled "Flexible Representation and Interactive Image Data Delivery Protocol", Ser. No. 60/091,697, inventors Paul Joseph Chang and Carlos Bentancourt, filed Jul. 3, 1998, and U.S. Patent Application, entitled "Methods and Apparatus for Dynamic Transfer of Image Data", Ser. No. 09/339,077, inventors Paul Joseph Chang and Carlos Bentancourt, filed Jun. 23, 1999, both of which are expressly incorporated herein by reference.

Although the dynamic transfer syntax substantially increases the ability to distribute large data files over a network, in some circumstances additional performance is required. For example, additional performance may be required to transfer large data files over networks with limited bandwidth. In one medical application, a physician, working away from the hospital, may have limited network bandwidth resources to connect to the hospital's enterprise network (e.g., the physician may communicate with the hospital's enterprise network via a 56K modem connection). For this example, the physician may desire to download, over the limited bandwidth connection, medical images that consist of large data files. To accommodate these low bandwidth applications, it is desirable to develop techniques to increase the transfer rates for distribution of large data files.

SUMMARY OF THE INVENTION

A compression technique, for use in a network environment, compresses transform data to improve transmission rates in low bandwidth applications. In one embodiment, the source data comprises source images, such as medical images. The source data is decomposed into transform data that consists of spatially related coefficients such that a block of coefficients permit reconstruction of identifiable portions of the source data. In a client-server embodiment, a client issues to a server a request for at least a portion of the source data. The request defines a block of the coefficients and at least one quantization value. In response to the client request, the server extracts transform data defined by the request. The transform data is quantized, in accordance with the quantization value, and is compressed to generate compressed data. The server transfers the compressed data to the client. The client decompresses the compressed data to obtain quantized data, and de-quantizes the quantized data to recover the transform data. The client then reconstructs the original source data from the transform data. For the imaging application, the client reconstructs an image from the transform data for display at the client.

The server only transmits to the client the data required to reconstruct the source image at the client. In one embodiment, the client caches previously requested coefficients with the quantization values for subsequent use. Under this scenario, the client issues a new request for a coefficient block to obtain incremental data necessary to fulfill the request. The new request includes two quantization values. The first quantization value is from the previously request coefficients cached at the client, and the second quantization value is for the new request for the coefficient block. The new request is transferred to the server. In response to the request, the server extracts transform data defined by the coefficient block. The server generates a first quantized coefficient block from the transform data using the first quantization value, and generates a second quantized coefficient block from the second quantization value. The server then generates a first and a second de-quantized coefficient blocks by multiplying the first and second quantized coefficient blocks by the first and second quantization values, respectively. Thereafter, an incremental coefficient block is generated by subtracting the first de-quantized coefficient block from the second de-quantized coefficient block. The incremental coefficient block is compressed to generate a compressed incremental coefficient block, and the compressed incremental coefficient block is transferred from the server to the client. At the client, the compressed incremental coefficient block is decompressed to recover the incremental coefficient block. The original coefficient block requested by the client is obtained by adding the cached coefficient block to the incremental coefficient block. The client reconstructs the source data from the coefficient block.

BRIEF DESCRIPTION OF THE DRAWINGS

FIG. 8b illustrates level three and level four decompositions for the 4K×4K source image of FIG. 8a.

DETAILED DESCRIPTION

A lossless compression technique is used in conjunction with a transform, which generates spatially related coefficients, to deliver data in applications with limited bandwidth. In one embodiment, the compression technique is implemented in a client-server environment. Specifically, the server utilizes the compression technique to compress transform data for transmission over a network to a client. The data consists of transform data decomposed into one or more hierarchical data representations, also referred to herein as pyramidal data representations. In general, the transform, a sub-band decomposition function, retains the spatial characteristics between the original source data and the resultant coefficients of the transform data. Thus, the coefficients from the transform data are readily identifiable for subsequent reconstruction of the original source data or any portion of the source data.

Figure 1:
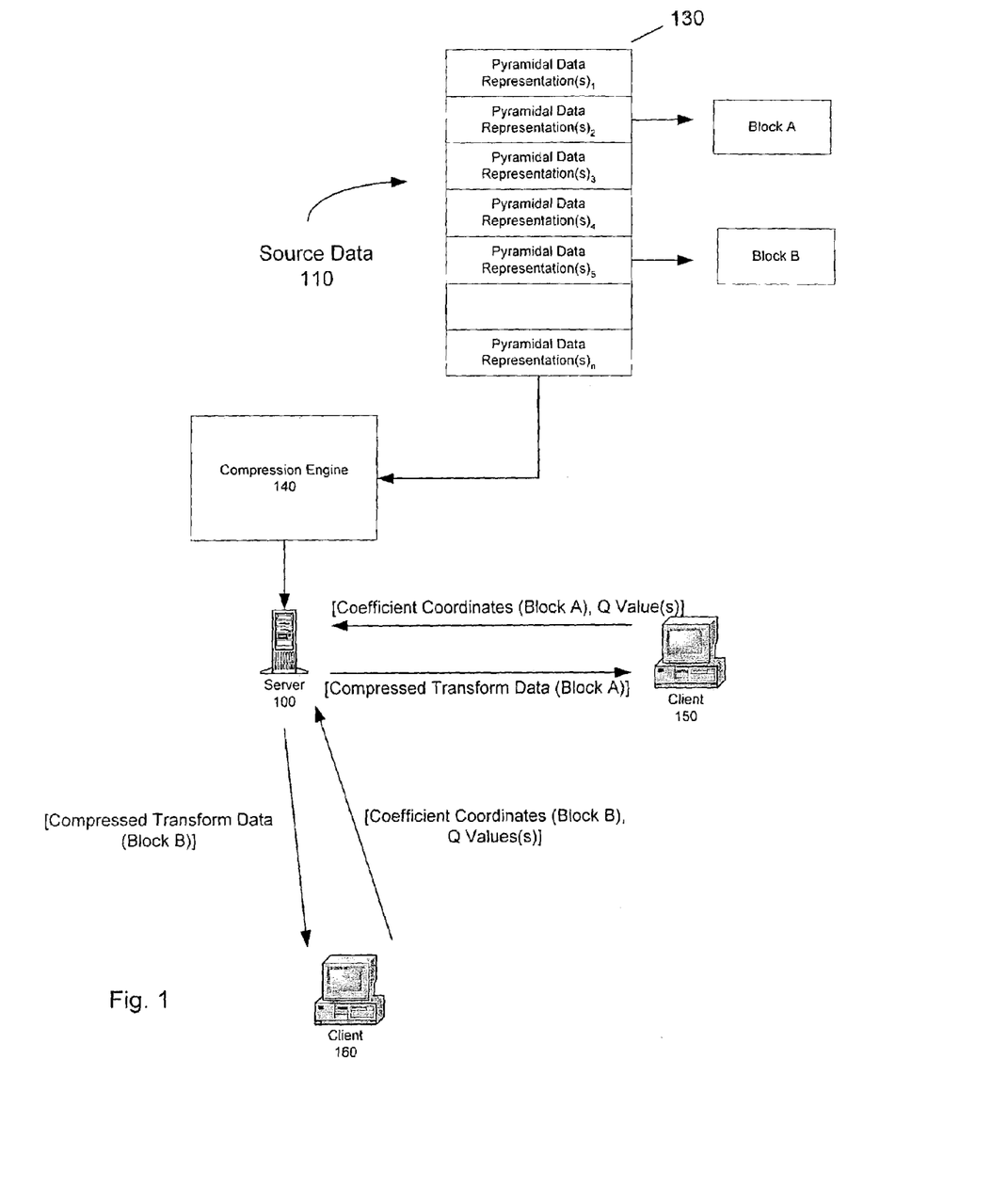
FIG. 1 is a block diagram illustrating one embodiment for implementing the compression techniques in a client-server environment.

The lossless compression techniques of the present invention have application for use in imaging, including medical imaging applications. For this application, a source image is decomposed to generate one or more pyramidal data representations of the source image. Specifically, for the medical imaging application, medical images (e.g., mammogram, X-Ray, MRI, CATSCAN, etc.) are digitized and decomposed to generate pyramidal data representations of the digitized medical images. Medical imaging applications require lossless transmission of data. Because the encoding or compression technique is lossless, no information regarding the original digitized medical image is discarded. Thus, the compression techniques are applicable to medical imaging. FIG. 1 is a block diagram illustrating one embodiment for implementing the compression techniques in a client-server environment. For this embodiment, a server 100 is coupled, via a network, to one or more clients (e.g., clients 150 and 160). As shown in FIG. 1, source data 110 is decomposed into "n" pyramidal data representation(s). Also, as shown in FIG. 1, the server 100 accesses the pyramidal data representations 130 for the source data 110. The server 100 further consists of a compression engine 140. In general, the compression engine 140 compresses, using a lossless encoder technique, the pyramidal data representation(s) 130.

During set up of a communications protocol between the server and the client, the client may specify one or more source data or images (i.e., pyramidal data representations) for the subsequent client request-server transfer process. Alternatively, the client may identify, as part of the request, specific source data or source images for data transfer. In one embodiment, the server-client implements "event" communication services offered through the Common Object Request Broker Architecture ("CORBA"). However, any network protocol may be used to implement client-server network communications without deviating from the spirit or scope of the invention.

For the embodiment of FIG. 1, data is transferred from the server 100 to a client upon the initiation of client requests. Specifically, a client generates a request that identifies at least a portion of a pyramidal data representation(s) for a source datum or source image. In one embodiment, the client generates a request that defines coefficient coordinates sufficient to reconstruct the desired portion of the source data at the client. In addition, for this embodiment, the client specifies a quantization value, Q, that defines the level of quantization requested. In general, the level of quantization, defined by Q, determines the amount of compressibility, such that a larger quantization value yields a larger increase in compressibility. However, a greater quantization value yields the loss of a greater amount of information. Thus, there is a trade-off between the loss of information and the compressibility of the data.

In response to the request, the server 100 extracts the coefficients, identified by the coefficient coordinates, quantizes the coefficients in accordance with the quantization value contained in the request, losslessly compresses the coefficients, and then transmits the compressed transform data to the client. This client-server process is illustrated in FIG. 1 through client 150 requesting coefficient coordinates for "block A" of pyramidal data representation (1), and receiving compress transform data for block A. Similarly, client 160 requests coefficient coordinates for block B of pyramidal data representation (5), and receives, in response to the Request, compress transform data for block B.

The compression techniques of the present invention have application for use when the network resources between the client and server are limited. For example, client 150 and client 160 may share network bandwidth. For this example, client 160 may consume, for a limited period of time, substantial network resources. During this time, client 150 is not allocated the necessary bandwidth to receive, in a reasonable period of time, uncompressed transform data from server 100. Under this scenario, client 150 requests compressed transform data. For this example, after client 150 gains access to an adequate amount of network resources, client 150 may request additional transform data necessary to reconstruct the source data at the full desired data integrity.

Although the compressed transform data consists of less information than the non-compressed transform data, the lower content information may be adequate for some applications. For the medical imaging application, a client computer, configured as a medical informatics system, may display, on the computer monitor, several low resolution images for a patient study (i.e., a collection of images and/or series for a patient). These medical images may be displayed on the computer to permit the user to arrange or organize the medical images in a manner suitable for the user. For example, the medical informatics system may initially display, horizontally, several medical images that pertain to a particular study. During this set-up phase, a user of the medical informatics system may re-arrange the images of a study by re-organizing the horizontal order of the images. During this set-up phase of organizing the medical images, it is not imperative that the highest informational content of the images is displayed. For this example, when increased network bandwidth is achieved, the client computer may receive additional transform data to display the image at the full information content. The transmission of compressed data in a medical informatics system also has application for use in panning operations. For this application, display of images at a lower informational content is adequate because the user is moving or panning the image across the computer display. Once the pan operation is terminated, additional image information may be transferred to permit the user to view the full informational content of the image.

The spatially related transform for the decomposition function may be generally defined as:

$$\hat{W}I=X,$$

wherein: $\hat{W}$ defines the transform function for a transform that generates spatially related coefficients; I represents the source data (e.g., image); and X represents the transformed data (e.g., transformed image).

In general, in a spatial transform, the information is aggregated so as to preserve the predictability of the geometry of the source image. For example, using a wavelet or sub-band transform, specific coefficients of the transform data may be identified that contribute to specific geometric features of the source image (i.e., a pre-defined portion of a source image is directly identifiable in the transform data).

The use of the wavelet transform to generate the pyramidal data structure provides a scalable solution for transferring different portions of a large data file. When the source image 110 is decomposed into the pyramidal data structure 130, sub-images and sub-resolution images are extracted directly from memory of the image server for optional quantization and compression. The image server then transmits only the compressed data (e.g., for low bandwidth applications) or compressed data, in the form of physical coefficients, required to reconstruct the exact size of the desired image for display at the client. Accordingly, the multi-resolution format is implicit in the pyramidal data structure. A further description of the transform function is contained below.

After the source data is transformed into the pyramidal data representation(s), the transformed data may be quantized and compressed. In one embodiment, to compress the transform data, the coefficients for a block of data are quantized by an integer value. In one embodiment, a block of coefficients are quantized by quantization bin widths, $Q_i$.

There is one quantization bin width per coefficient block. Generally, this operation may be expressed as:

$$\hat{Q}\hat{W}I=\hat{Q}R,$$

wherein, R represents a block of coefficients in the transform data, and $\hat{Q}$ represents the quantized function. For this expression, if truncation toward zero is used, the quantized function may be expressed as follows. If (R>0), then $$R_Q = \frac{R+.5Q}{Q}$$

else, (i.e., if R<0), $$R_Q = \frac{R-.5Q}{Q}$$

wherein, Q is an integer and the resultant is consistently truncated (i.e., either towards or away from zero), such that $R_Q$ is a multiple of the quantization bin width, Q. In one embodiment, the resultant is truncated towards zero.

In one embodiment, the coefficients are quantized in accordance with the corresponding level of the decomposition. Thus, for this embodiment, there is one quantization bin width, Q, for each level. For this embodiment, the quantization values may be quantized as follows:

$$R_{L1}^Q = \frac{R(\text{Level 1})}{Q1}$$

$$R_{L2}^Q = \frac{R(\text{Level 2})}{Q2}$$

$$R_{L3}^Q = \frac{R(\text{Level 3})}{Q3}$$

$$R_{LN}^Q = \frac{R(\text{Level } N)}{QN}$$

wherein, "L" and "Level" represent the level of the decomposition for the "N" level example, and Q1, Q2, Q3 and QN represent quantization bin widths for the respective levels. Although the above expression represents quantization based on levels of the decomposition, any combination of different quantization values may be used to quantize a set of coefficients without deviating from the spirit or scope of the invention.

In another embodiment, only the high pass coefficients of the decomposition transform are quantized. For example, if the coefficient blocks for a level of the pyramidal data representation are designated low low ("LL"), low high ("LH"), high low ("HL") and high high ("HH") (See FIGS. 8a and 8b), then the high pass coefficients are low high ("LH"), high low ("HL") and high high ("HH"). For this embodiment, the low low ("LL") coefficients are not quantized or compressed. In other embodiments, the low low ("LL") coefficients are quantized and compressed. Also, for the embodiment that quantized coefficients based on the level of the decomposition, the high pass coefficients may be aggregated into a quantized coefficient block as follows:

$$R^Q_{Level\ 1} = \frac{R(LH + HL + HH)}{Q1}$$

$$R^Q_{Level\ 2} = \frac{R(LH + HL + HH)}{Q2}$$

$$R^Q_{Level\ 3} = \frac{R(LH + HL + HH)}{Q3}$$

$$R^Q_{Level\ N} = \frac{R(LH + HL + HH)}{QN}$$

Accordingly, for this example, the high-energy components for each coefficient block of the transform are quantized for compression processing. Although the above example quantizes components of the transform, any block of transform data may be quantized for subsequent compression. In one embodiment, the coefficient blocks quantized are based on client requests for compressed transform data. As is described more fully below, the amount of information aggregated into a compressed coefficient is defined by the quantization bin width value, Q.

The quantized coefficient block, $R^Q$, is compressed to generate the transmission coefficient block in accordance with the expression:

$$R^T = \hat{E}R^Q;$$

wherein, $\hat{E}$ defines the compression expression, and $R^T$ defines the compressed coefficient block for transmission. In general, the compression function, $\hat{E}$, comprises a lossless coder. Any encoding rule may be used for the compression function, $\hat{E}$, without deviating from the spirit or scope of the invention. For example, the compression function, $\hat{E}$, may be implemented with a Rice encoding function with no run length encoding, Huffman coding with run length encoding, arithmetic encoding, etc. In one embodiment, data not quantized (e.g., the low low ("LL") component of a level) is encoded using Rice encoder, and data quantized, which typically include runs of zeros, is encoded using an arithmetic encoder.

The compressed coefficient block, $R^T$, is transmitted to the client. At the client, the inverse quantization and decoder functions are executed. This operation may be expressed as:

$$R = \hat{Q}^{-1}\hat{E}^{-1}R_T.$$

The inverse transform, $\hat{W}^{-1}$ is performed on the coefficients, R, to generate the original compressed data.

Figure 2:
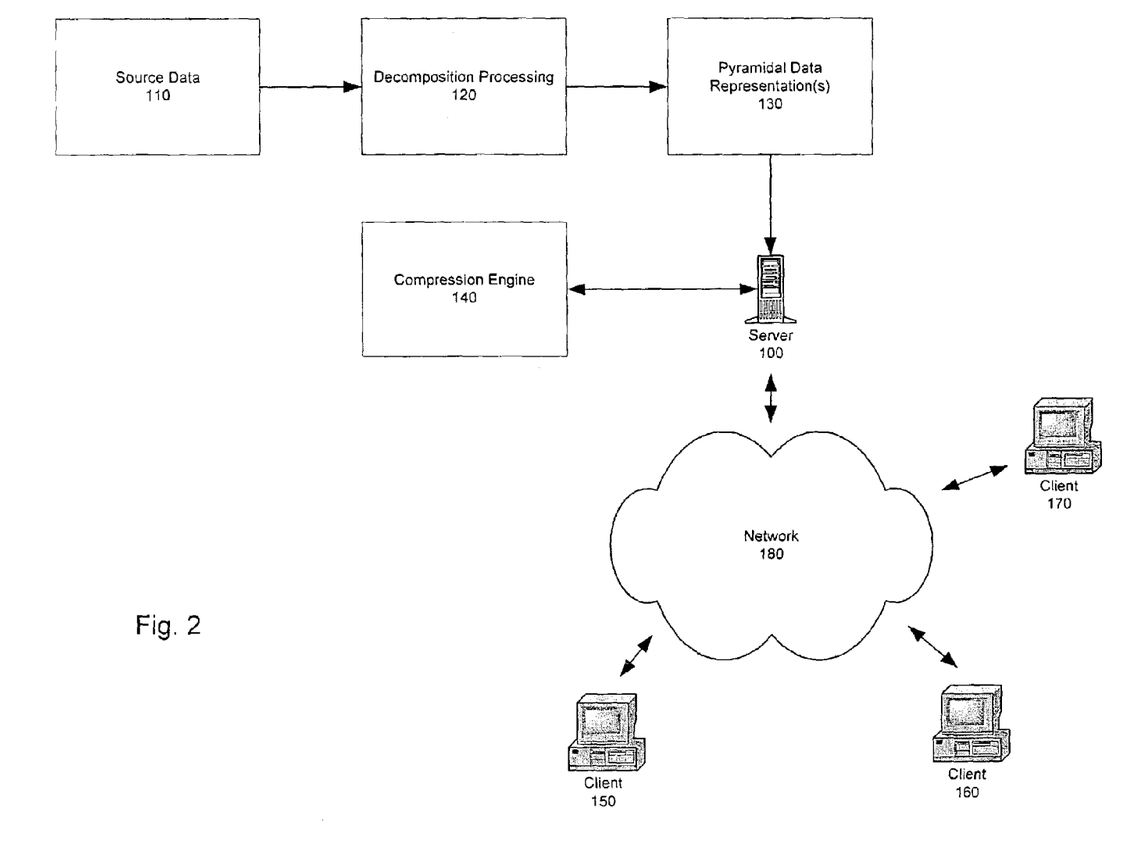
FIG. 2 is a block diagram illustrating one embodiment for processing source data.

Compression Embodiments:

FIG. 2 is a block diagram illustrating one embodiment for processing source data. For this embodiment, source data is processed for distribution to a plurality of clients (i.e., clients 150, 160 and 170). In one embodiment, source data 110 comprises source image(s). If source data 110 comprises images, then the source images 110 are processed for distribution over network 180 for display on client computers (150, 160 and 170). For the embodiment of FIG. 2, source data 110 is input to decomposition processing 120. In general, decomposition processing 120 executes a wavelet transform to generate the pyramidal data representations 130. As shown in FIG. 2, server 100 has access to the pyramidal data representations 130. In a preferred embodiment, the source data is "preprocessed" and stored in the hierarchical or pyramidal data representation. Also, the server 100 has access to the compression engine 140. In one embodiment, the compression engine 140 is software operating on server 100.

Figure 3:
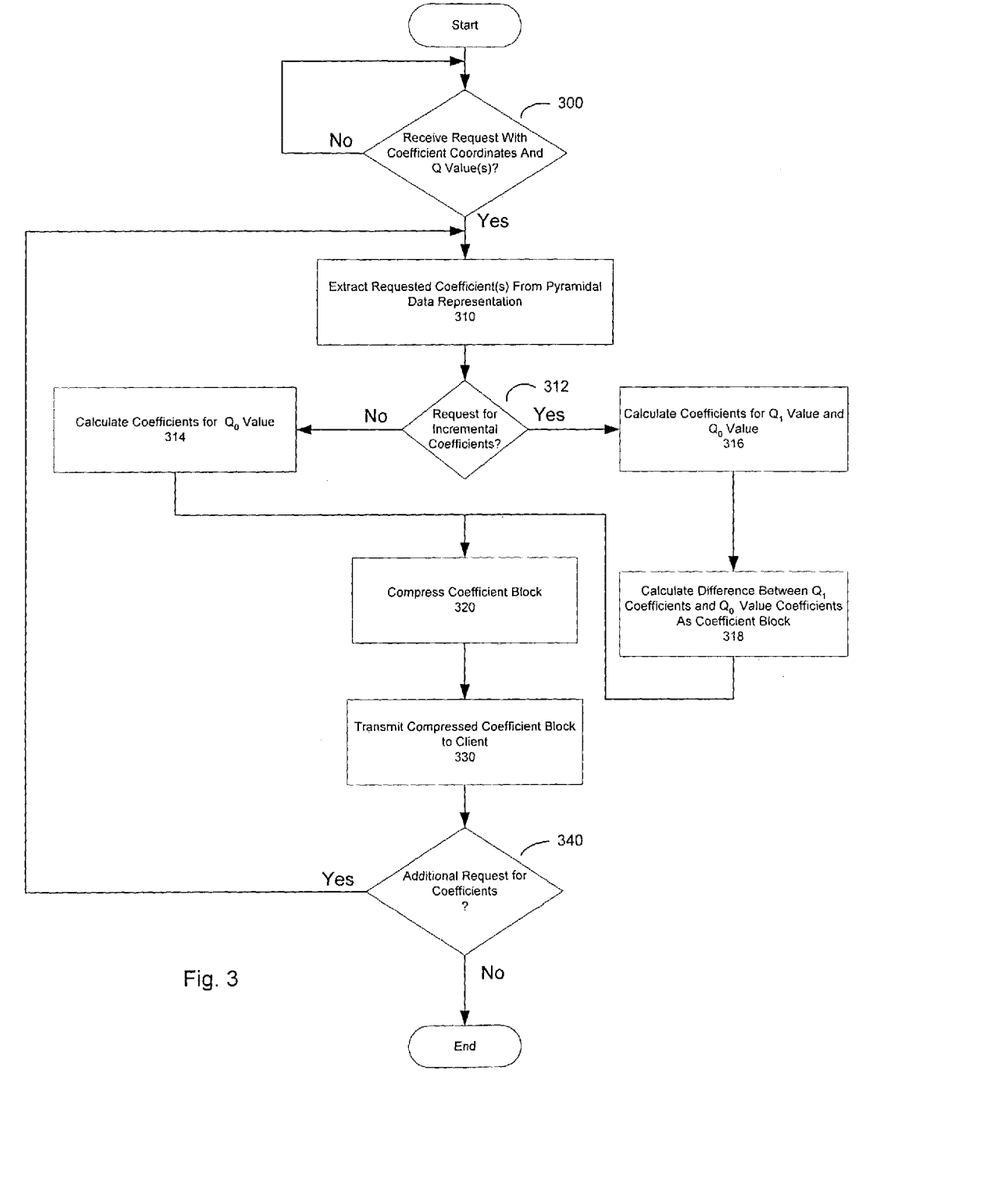
FIG. 3 is a flow diagram illustrating one embodiment for implementing the server process incorporating the compression techniques.

FIG. 3 is a flow diagram illustrating one embodiment for implementing the server process incorporating the compression techniques. The process to transmit compress transform data from the server to the client is initiated by a client request (block 300, FIG. 3). Although the compression techniques of the present invention are described in conjunction with a client request process and a "stateless" server, any process that uses compressed transform data may be substituted without deviating from the spirit or scope of the invention. The client request includes coefficient coordinates, which identify a block of transform data, and at least one quantization value ("Q"). If the client requests incremental data to supplement data previously received from an earlier transfer, then the client request includes two quantization values, referred to herein as "$Q_0$" and "$Q_1$." Using this nomenclature, $Q_0$ connotes the quantization value from the earlier request, and $Q_1$ connotes the quantization value for the current request.

Based on the client request, the server extracts a block of coefficients from the pyramidal data representation (block 310, FIG. 3). If the request was not a request for "incremental" coefficients, then the server calculates quantized coefficients for the "Q" value (blocks 312 and 314 FIG. 3). As discussed above, coefficient values are divided by the quantization value, and rounded to an integer value (e.g., if truncated downward, the remainder of the division is discarded). Alternatively, if the client request was for incremental coefficients, then quantized coefficients are calculated for both $Q_0$ and $Q_1$ values (blocks 312 and 316, FIG. 3). Under this scenario, the $Q_1$ quantized coefficients contain more information than the $Q_0$ quantized coefficients (i.e., the client request was for more incremental data to supplement the earlier request). Thus, the client only issues requests for coefficients if $Q_1 < Q_0$. For this operation, the coefficient values are divided by the quantization values for both $Q_0$ and $Q_1$, are rounded to an integer value, and are multiplied by the quantization value. To calculate the incremental coefficient values, the quantized coefficients for $Q_0$ are subtracted from the quantized coefficients for $Q_1$ (block 318, FIG. 3). The operations depicted in blocks 316 and 318 of FIG. 3 may be expressed as:

$$\left|\frac{R}{Q1}\right|Q1 - \left|\frac{R}{Q0}\right|Q0 = R^I$$

wherein, $R^I$ represents the incremental or residual quantized coefficients. The coefficient block is then compressed using a lossless coder (block 320, FIG. 3).

The compressed block of transform data is transmitted to the client (block 330, FIG. 3). As shown in FIG. 3, if the client issues additional requests for compressed coefficients, the process is repeated (i.e., blocks 310, 312, 314, 316, 318, 320 and 330 are executed). For example, if the client computer rendered an image as a result of a first request with a high quantization value, and the image quality was poor, then the client may generate a new request for the same coefficient block with a lower quantization value, up to lossless, to improve image quality. For an application requiring full data integrity of the image, the additional coefficients not sent as result of the compression are sent when more network resources are available. Because the compression technique utilizes a lossless coder, the residual value, lost as a result of the quantization, may be combined with the original compressed block to obtain all data associated with the corresponding coefficient block.

Figure 4:
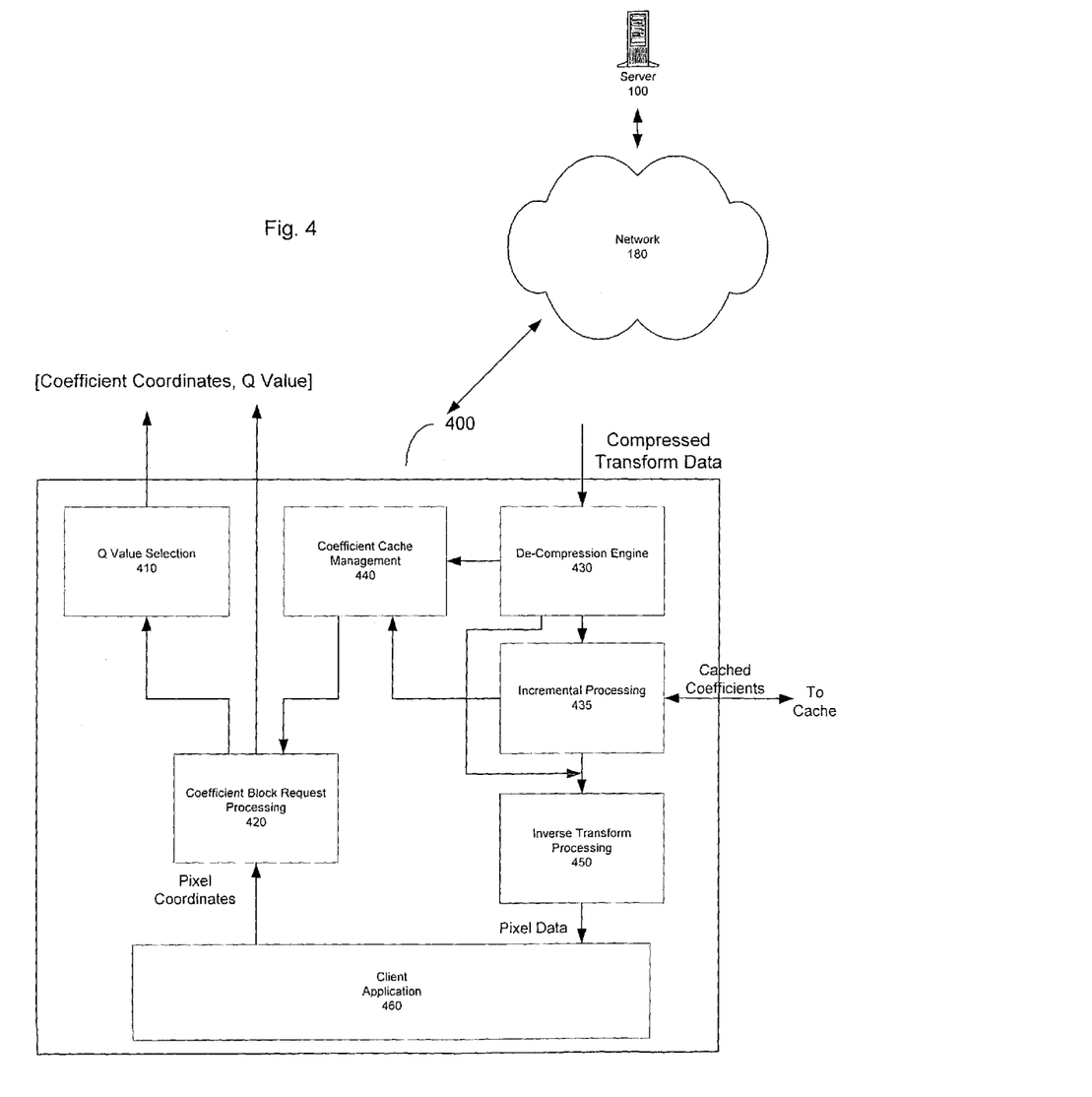
FIG. 4 is a block diagram illustrating one embodiment for implementing, on the client, processes for the compression techniques.

FIG. 4 is a block diagram illustrating one embodiment for implementing, on the client, processes for the compression techniques. In general, client 400 implements a plurality of processes to generate requests for compressed transform data from server 100. The client 400 also implements a plurality of processes to process compressed transform data. A client application 460 is an underlying application using the source data. For example, client application 460 may comprise image-rendering software and source data 110 may consist of images. Also, as described in conjunction with a discussion of FIG. 7, client application 460 may comprise a medical informatics system, including a user interface to permit a user to select, organize, navigate and analyze medical images. The client application 460 generates requests to coefficient block request processing 420. In one embodiment for image distribution, client application 460 generates a set of pixel coordinates to identify a portion of the source image 110 at a specified resolution. In turn, coefficient block request processing 420 maps the pixel coordinates at a specified resolution to coefficient coordinates. The coefficient coordinates identify a block of coefficients in the pyramidal data representation 130.

Figure 6:
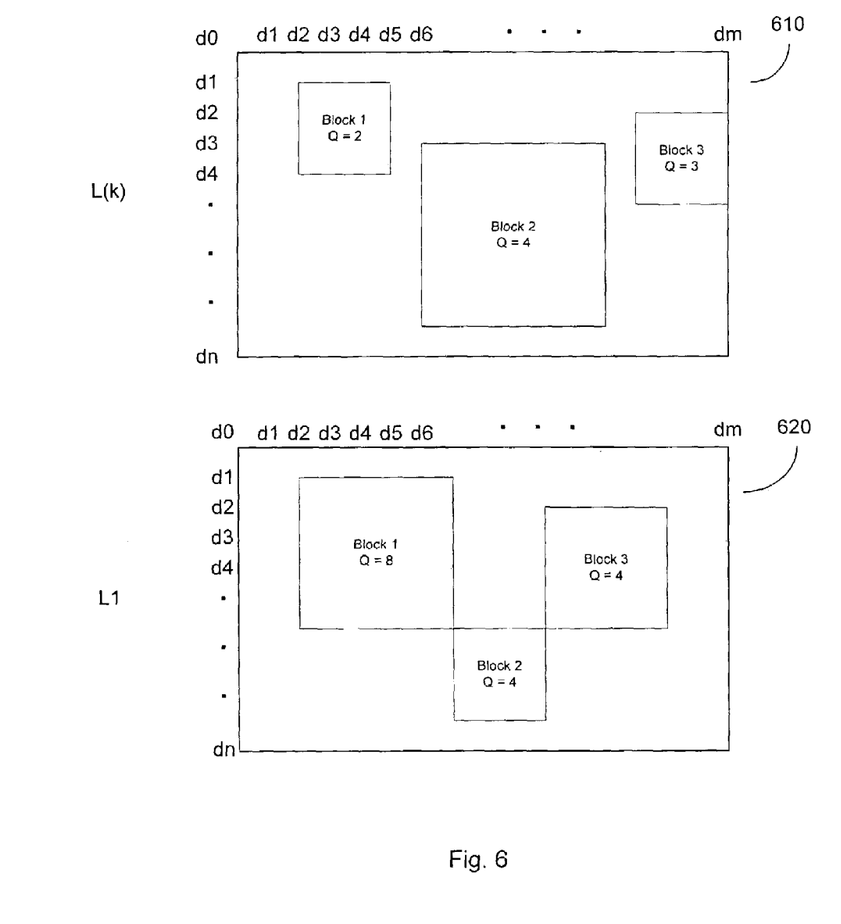
FIG. 6 is a block diagram illustrating the caching of coefficient blocks at the client.

In one embodiment, a granularity of coefficient block size for requests is defined. For this embodiment, the granularity of coefficient block sizes is chosen to implement efficient caching at the client. Specifically, the client is restricted coefficient blocks requests, which define rows and columns in a level of the image decomposition, in accordance with the expressions:

(n modulo d)=0

(m modulo d)=0 wherein, "n" defines the integer number of rows in the coefficient block request, "m" defines the integer number of columns in the coefficient block request, and "d", an integer, defines the smallest level of granularity for the request. One implementation for restricting the granularity of coefficient requests selects a block size granularity of 16×16. For this implementation, d, in the above expressions, is equal to "16." A description of implementing caching at the client with a restriction in the granularity of block sizes is described below in conjunction with a description of FIG. 6.

The client application 460 may also specified criteria for the selection of the quantization value. Specifically, a Q value selection 410 selects a Q value for a specific request. In one embodiment, the quantization bin widths are chosen to optimally minimize the distortion introduced by the quantization process while minimizing the data rate. Although any distribution may be used, the wavelet transform produces high frequency coefficients from most images that exhibit a Laplacian distribution $$\left(\text{e.g., } p(x) = \frac{+\lambda}{2} e^{-\lambda |x|}\right).$$

Because the transform is unitary, the coefficients are mathematically independent (i.e., there is not redundant information in different coefficients). If quantized, the boundaries are $$d_i = \frac{v}{Qi},$$

and the probability of being in a quantized bin is:

$$P_i = \int_{di-1}^{di} p(x) dx$$

If reconstruction of a quantized coefficient is chosen as:

$$r_i = \left|\frac{v}{Qi}\right| Qi$$

(although any point may be chosen in the bin), then the distortion introduced by the quantization is:

$$Di = \int_{di-1}^{di} (x - r_i)^2 p(x) dx$$

and the distortion for a block of coefficients is:

$$D_{Ti} = \Sigma D_i$$

Then, for a set of blocks:

$$D_T = \Sigma D_{Ti}$$

In addition, the bit rate is:

$$R_i = p^i \log(p_i) \text{ (Log in base 2)}$$

Similarly, for rate expressions $$R_{Ti} = \Sigma R_i$$

and $R_{Total} = \Sigma R_{Ti}$ minimization of the Lagrangian multiplier equation:

$$R_{Total}(Q_i) + \xi D_{Total}(Q_i)$$

yields an optimal $Q_i$.

Client 400 also includes coefficient cache management 440. The coefficient cache management 440 tracks coefficients cached at the client, as well as their corresponding quantization ("Q") values. As described above, the coefficient cache management 440 is used to determine whether a client request is for new coefficients or for incremental coefficients to augment coefficients cached at the client. One embodiment for implementing the coefficient cache management 440 is described more fully below in conjunction with a discussion of FIG. 6.

As shown in FIG. 4, in response to the client request, client 400 receives compressed transform data into the decompression engine 430. The decompression engine 430 executes the decoder function for the corresponding coding function of compression engine 140 (FIG. 2). If the request was for incremental coefficients, then incremental processing 435 calculates the coefficients from the requested coefficients and the cached coefficients in accordance with the expression:

$$R_{block} = R_{inc} + R_{cache}$$

wherein, $R_{block}$ represents the coefficients identified in the request, $R_{inc}$ represents the incremental coefficients transmitted from the server, and $R_{cache}$ represents the coefficients cached in client memory.

The coefficients, from either de-compression engine 430 (original coefficient block) or incremental processing 435 (incremental coefficient block) are input to inverse transform processing 450. The inverse transform processing 450 executes the inverse transform (i.e., inverse from decomposition processing 120) to reconstruct the original source data. If client application 460 is an imaging application, then inverse transform processing 450 reconstructs pixel data for display on an output display of client computer 400. The client updates the cache, as required, with the highest quality coefficients.

Figure 5:
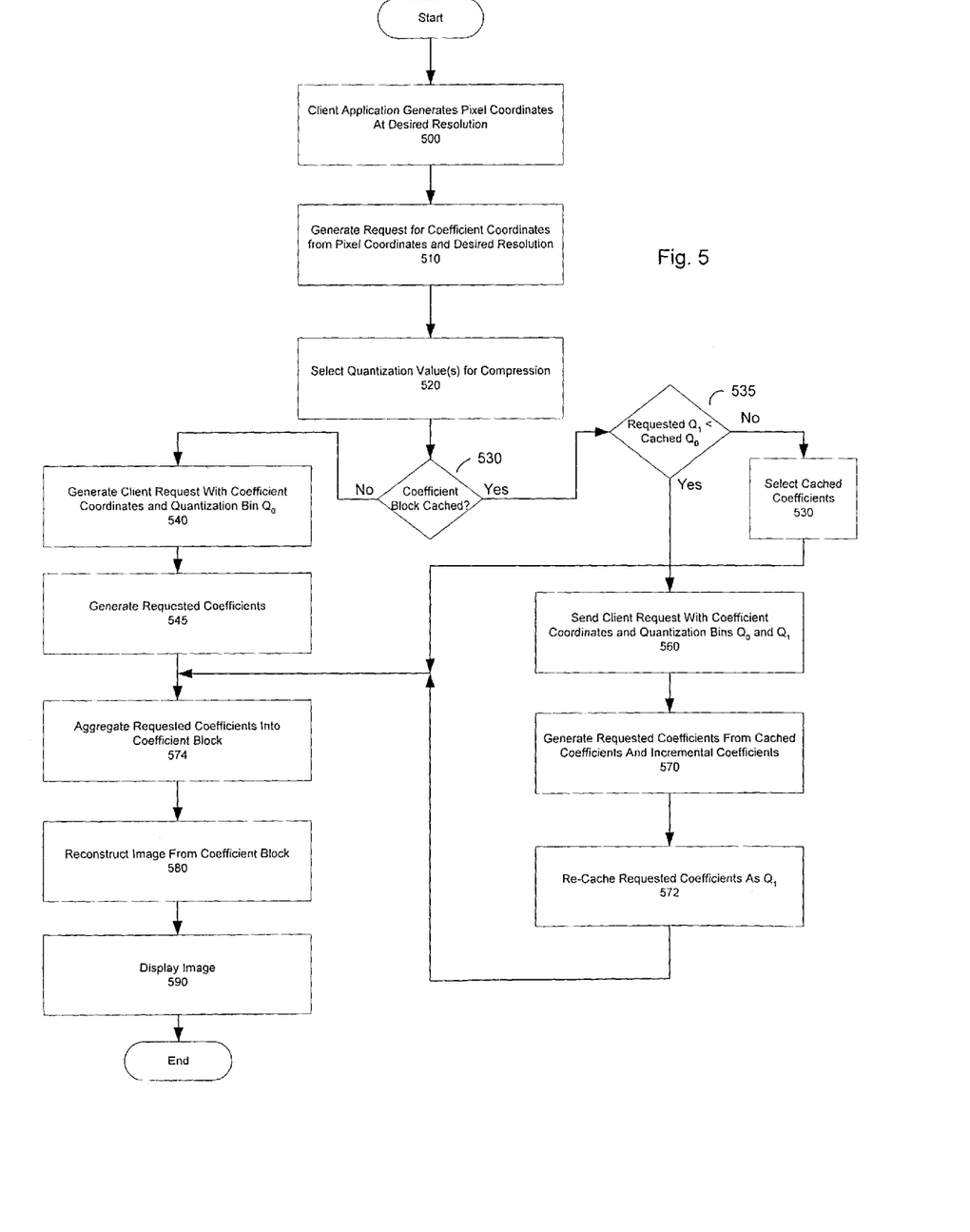
FIG. 5 is a flow diagram illustrating one embodiment for implementing the compression techniques in a client.

FIG. 5 is a flow diagram illustrating one embodiment for implementing the compression techniques in a client. An underlying client application generates data requirements to request source data. For the imaging application, the client application generates pixel coordinates at a desired resolution (block 500, FIG. 5). From the pixel coordinates, coefficient coordinates, identifying a portion of the source image at a specified level of the decomposition, are generated (block 510, FIG. 5). Also, the client selects a quantization value for the corresponding coefficient block (block 520, FIG. 5). If data for the corresponding coefficient block is not cached, then the client generates a request with coefficient coordinates and the quantization value, Q, selected for the coefficient block (blocks 530 and 540, FIG. 5). The client generates the requested coefficient block by decompressing the coefficients received, using the inverse decoder for the lossless coder, and multiplying the resultant coefficients by the quantization value (block 545, FIG. 5). Alternatively, if data is cached for the coefficient block, then the client determines whether the requested quantization bin value, $Q_1$, is less than the quantization bin value, $Q_0$, for the cached data (block 535, FIG. 3). If $Q_1$ is greater than $Q_0$, then the data cached contains more information than the data requested. Under this scenario, the client utilizes the cached data (block 550, FIG. 5).

If $Q_1$ is less than $Q_0$, then the data cached contains less information than the data requested. A client request is then generated with the coefficient coordinates as well as both $Q_0$ and $Q_1$, quantization values (block 560, FIG. 5). As discussed above in conjunction with FIG. 3, the server transmits "incremental" data, representing the data necessary to form a coefficient block with Q1 from the coefficient block with $Q_0$. To this end, the client receives the incremental coefficients from the server, decompresses the incremental coefficients using the inverse decoder for the lossless coder (i.e., inverse function of compression engine 140), and sums the cached coefficients with the incremental coefficients to obtain the requested coefficients (block 570, FIG. 5). In addition, the client caches the requested coefficients along with the quantization value, $Q_1$ (block 572, FIG. 5).

The client-server process is a recursive process, such that the client aggregates coefficients from all lower levels to reconstruct an image at a desired higher level. The client only specifies in the request the coefficients required. For example, the client may cache, for a portion of a source image, all requisite coefficients from level 1. In order to reconstruct the portion of the image at a resolution corresponding to level 2, the client generates a request for the level 2 coefficients, and aggregates the level 1 coefficients, previously stored, with the level 2 coefficients to reconstruct the portion of the source image. For the embodiments of FIGS. 4 and 5, the clients aggregate the requested coefficients into the coefficient block (block 574, FIG. 5). From the coefficient block, the source data is reconstructed from the coefficient coordinates (block 580, FIG. 5). For the imaging application, the requested image is reconstructed from the coefficients for display at the client.

FIG. 6 is a block diagram illustrating one embodiment for tracking coefficients cached at the client. As discussed above, the client may cache quantized coefficient blocks for subsequent use. The coefficient blocks showed in FIG. 6 are logically arranged into levels corresponding to the levels of decomposition in the pyramidal data representation (i.e., levels 1 through "k"). Specifically, for the example of FIG. 6, block 610 designates coefficients cached for decomposition level "k", and block 620 designates coefficients cached for decomposition level "1." Blocks 610 and 620 logically depict, for the respective level, "dm" columns and "dn" rows of coefficients. As discussed above, the integer value "d" is a minimum granularity for caching block sizes (e.g., d=16), and integer "n" and "m", when multiplied with "d", specifies row and column coefficient coordinates, respectively.

In general, the client stores information to track coefficient blocks cached at the client. For the example of FIG. 6, level "k", labeled 610 on FIG. 6, tracks information for three blocks of coefficients (e.g., blocks 1, 2, and 3), and level 1, labeled 620 on FIG. 6, tracks information for three blocks of coefficients (e.g., blocks 1, 2, and 3). Each coefficient block is tracked by using its corresponding coordinates. For example, block 1 contains the coefficient coordinates (d1, d2) (d4, d5) that define the row and column of the upper left corner and the row and column of the lower right corner of the block. In addition to tracking the coefficient coordinates for coefficient blocks cached at the client, the client tracks the quantization value for the block. For the level 1 example, block 1 has a Q value of 8, block 2 has a Q value of 4 and block 3 has a Q value of 4.

In one embodiment, the client requests coefficient blocks iteratively. For this embodiment, the client requests new coefficient blocks (i.e., coefficient blocks with no information cached) in separate requests from client requests for residual or incremental coefficient blocks (i.e., coefficient blocks with information cached). The separate client requests permit efficient use of memory.

In one embodiment, the client implements an efficient cache overhead structure to track the cached coefficients. To track coefficient blocks cached, the client stores a pointer to the start of the block, the block size (e.g., rows and columns), and the corresponding quantization value. The cache overhead structure is used to determine coefficients cached for subsequent use (See blocks 535, 530, and 574 of FIG. 5).

A Compression Example:

The following example illustrates one embodiment for implementing compression with a spatially related transform of data. For this example, the client request is as follows:

$$[(L=1), (X_o, Y_o), (4n, 4m)];$$

wherein, L defines the level in the transform; $X_o$ and $Y_o$ represent the row and column coordinates, respectively, of the starting point of the block (e.g., the upper left coordinate of the block); and "n" and "m", integers, represent the number of rows and columns, respectively, in the block, multiplied by four. For this example, the minimum granularity for a block request is 4×4.

The example client request consists of a 4×4 block of coefficient coordinates (i.e., the minimum block request size for this example). Specifically, for an example hierarchical representation "A", at the specified level and block coordinates [($X_o$, $Y_o$), (4, 4)], the example requested block consists of the following coefficient coordinates:

$$A = \begin{vmatrix} 86 & -37 & 44 & 18 \\ 0 & 13 & -8 & -12 \\ 110 & 80 & -30 & -19 \\ 115 & 76 & 0 & -26 \end{vmatrix}$$

Also, the client requests the above-identified block at a bin width of "8." From this request, the server, truncating the coefficients towards zero, generates the following block:

$$A_8 = \left| \frac{A}{8} \right| = \begin{vmatrix} 10 & -4 & 5 & 2 \\ 0 & 1 & -1 & -1 \\ 13 & 10 & -3 & -2 \\ 14 & 9 & 0 & -3 \end{vmatrix}$$

The server losslessly compresses the block of coefficient coordinates, $A_8$, and transmits the block of coefficient coordinates, $A_8$, to the client. At the client, the coefficient coordinates, $A_8$, are decompressed (i.e., $E^{-1}$ A=A), and are multiplied by the quantization value (e.g., Q=8). The pixels are reconstructed from the coefficients and subsequently displayed. At the client, the user may decide that the data resolution quality is too poor for the user's intended purpose. For example, the user may be viewing a medical image, and the user may wish to view more details of the medical image at the requested block. To obtain additional information, while still using compression, the client generates a new request including a new "Q" value. For this example, the new request specifies the same block of data (i.e., [L=1, ($X_o$, $Y_o$), (4, 4)]), but at a higher quality quantization bin width of "4." Because the client already has the coefficients from the quantized block, $A_8$, the client only needs the incremental coefficients necessary to reconstruct the new block, $A_4$. To this end, the client request includes two quantization values, $Q_0$ and $Q_1$ ($Q_0$=8 and $Q_1$=4).

In response to the new request, the server obtains the coefficient coordinates, defined by the new request (i.e., [L=1, ($X_o$, $Y_o$), (4, 4)]), and constructs a new quantized block, $A_{4,8}$, containing only the incremental coefficients. The server generates a block of coefficients in accordance with the relationship:

$$A_8*8-A_4*4=A_{4,8}.$$

Specifically, the server calculates the coefficients for $A_4$ as follows:

$$A_4 = \left| \frac{A}{4} \right| = \begin{vmatrix} 21 & -9 & 11 & 4 \\ 0 & 3 & -2 & -3 \\ 27 & 20 & -7 & -4 \\ 28 & 19 & 0 & -6 \end{vmatrix}$$

Also, the server multiplies the block by 4 to obtain $A_4*4$ as follows:

$$A_4*4 = \begin{vmatrix} 84 & -36 & 44 & 16 \\ 0 & 12 & -8 & -12 \\ 108 & 80 & -28 & -16 \\ 112 & 76 & 0 & -24 \end{vmatrix}$$

The server further calculates $A_8$ from the coefficient block as follows:

$$A_8*8 = \begin{vmatrix} 80 & -32 & 40 & 16 \\ 0 & 8 & -8 & -8 \\ 104 & 80 & -24 & -16 \\ 112 & 72 & 0 & -24 \end{vmatrix}$$

To obtain the difference between the coefficients $A_4*4$ and $A_8*8$, (i.e., $A_{4,8}$), the server performs the following operation:

$$A_{4,8} = A_4*4 - A_8*8 = \begin{vmatrix} 4 & -4 & 4 & 0 \\ 0 & 4 & 0 & -4 \\ 4 & 0 & -4 & 0 \\ 0 & 4 & 0 & 0 \end{vmatrix}$$

The server, in response to the new client request, transmits the $A_{4,8}$ coefficients.

The client receives the $A_{4,8}$ coefficients, and calculates $A_4$ from the $A_{4,8}$ coefficients and the $A_8$ coefficients (i.e., $A_4=A_{4,8}+A_8$). Specifically, the client retrieves, from cache memory, $A_8$:

$$A_8 = \begin{vmatrix} 80 & -32 & 40 & 16 \\ 0 & 8 & -8 & -8 \\ 104 & 80 & -24 & -16 \\ 112 & 72 & 0 & -24 \end{vmatrix}$$

then calculates $A_4$ as follows:

$$A_4 = \begin{vmatrix} 4 & -4 & 4 & 0 \\ 0 & 4 & 0 & -4 \\ 4 & 0 & -4 & 0 \\ 0 & 4 & 0 & 0 \end{vmatrix} + \begin{vmatrix} 80 & -32 & 40 & 16 \\ 0 & 8 & -8 & -8 \\ 104 & 80 & -24 & -16 \\ 112 & 72 & 0 & -24 \end{vmatrix}$$

$$A_4 = \begin{vmatrix} 84 & -36 & 44 & 16 \\ 0 & 12 & -8 & -12 \\ 108 & 80 & -28 & -16 \\ 112 & 76 & 0 & -24 \end{vmatrix}$$

Thereafter, $A_4$ is stored in cache memory at the client.

Figure 7:
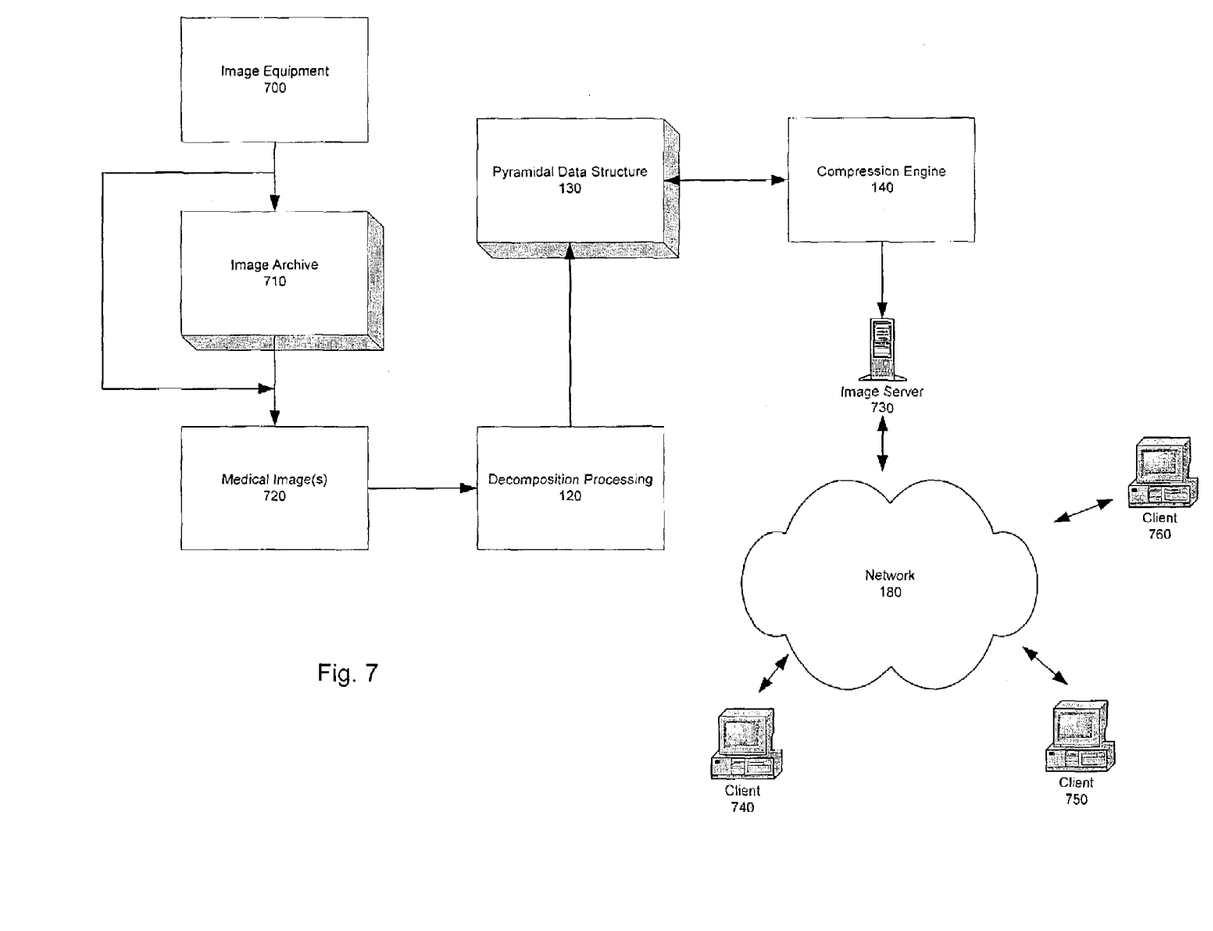
FIG. 7 is a block diagram illustrating one embodiment for use of the compression techniques in a medical imaging application.

Medical Imaging Application:

FIG. 7 is a block diagram illustrating one embodiment for use of the compression techniques in a medical imaging application. For this embodiment, a medical imaging system optionally includes imaging equipment 700 to generate medical images 720 for optional storage in electronic form in an image archive 710. The image archive 710 contains electronic storage components such as disk drives and tape drives used to store the images in a highly reliable manner. The images are stored in a suitable archival format, such as the DICOM format. In one embodiment, after decomposition into the pyramidal data structure 130, the DIACOM data is retained, and additional information specific to the image distribution system is augmented. The imaging equipment 700 includes any type of equipment to generate images, including medical equipment (e.g., X-ray equipment, CT scanners, and MR scanners).

For this embodiment, the medical imaging system includes at least one image server 730. As shown in FIG. 7, the image server 730 is coupled to a plurality of clients 740, 750 and 760. The medical images 720 are processed, by decomposition processing 120, to generate a pyramidal data structure 130.

Transform Overview:

In general, the pyramidal data structure 130 comprises a hierarchical representation of the source image. Each level of the hierarchical representation is sufficient to reconstruct the source image at a given resolution. In one embodiment, the decomposition processing 120 utilizes a sub-band decomposition to generate the hierarchical representation. In general, sub-band decomposition consists of executing a process to separate "high-pass" information from "low-pass" information. For the sub-band decomposition embodiment, decomposition processing 120 comprises a finite impulse response (FIR) filter.

The wavelet transform function embodiment generates mathematically independent information among the levels of the hierarchical representation. Accordingly, there is no redundant information in the pyramidal data structure 130. Thus, pyramidal data structure 130 is not merely multiple replications of the source image at different resolutions, which consists of redundant information, but it contains unique data at the different levels of the hierarchical representation. The mathematically independent nature of the wavelet transform permits minimizing the amount of data transferred over a network, by requiring only the transfer of "additional data" not yet transferred to the computer from the server necessary to construct a given image. The wavelet transforms are lossless, in that no data from the original source image is lost in the decomposition into the pyramidal data structure 130. Accordingly, the transform has applications for use in medical imaging and medical imaging applications.

In one embodiment, fixed point kernels are used in the wavelet transform (i.e., decomposition processing 125). The use of fixed point kernels generates coefficients for the pyramidal data structure that permit an easy implementation into a standard pixel footprint. The wavelet transform, used in one embodiment, is a spatial transform that generates a dynamic range of the "low low" component equal to the dynamic range of the source image. Because of this characteristic, the "low low" component does not contain overshoot or undershoot components. As a result, the use of this fixed point kernel is preferred because no normalization process to convert the transformed dynamic range to the pixel dynamic range is required.

In one embodiment, the medical imaging system 700 directly utilizes the transform coefficients as pixels, without re-scaling the coefficients. The range of the high-pass components (i.e., "low high", "high low", and "high high" components) is the range of the input source data plus up to four bits per coefficient (e.g., 2 bits). This characteristic permits mapping of all components (i.e., high and low pass components) to a given pixel footprint.

In other embodiments, the wavelet transform may be used to generate multi-spectral transform data. In general, multi-spectral transform data aggregates multi-components of the source image into a vector for the transform data. Through use of multi-spectral transform data, the wavelet transform may aggregate multi-dimensional data (e.g., two dimensional, three dimensional, etc.) for a source image. For example, multi-dimensional transform data may be used to reconstruct a source image in three dimensions. Also, the multi-spectral transform data may comprise any type of attribute for binding to the source image, such as color variations and/or non-visual components (e.g., infrared components).

In general, to generate the pyramidal data structure 130, the transform is applied across the columns, and then this transform, or a different transform, is applied across the rows (i.e., or vice versa). The selection of the transform for decomposition processing 120 is dependent upon the particular characteristics of the pyramidal data structure desired. Each level of the pyramidal data structure is generated by recurring on the low-pass, "low low", of the previous higher level. This recursion continues until a predetermined size is obtained. For example, in one embodiment, the lowest level in the pyramidal data structure for a source image consists of a low-pass component of approximately 128×128. However, any granularity of resolution may be generated for use in a pyramidal data structure without deviating from the spirit or scope of the invention. Also, any quadrant may be used in the recursion process with any desired transform.

Figure 8A:
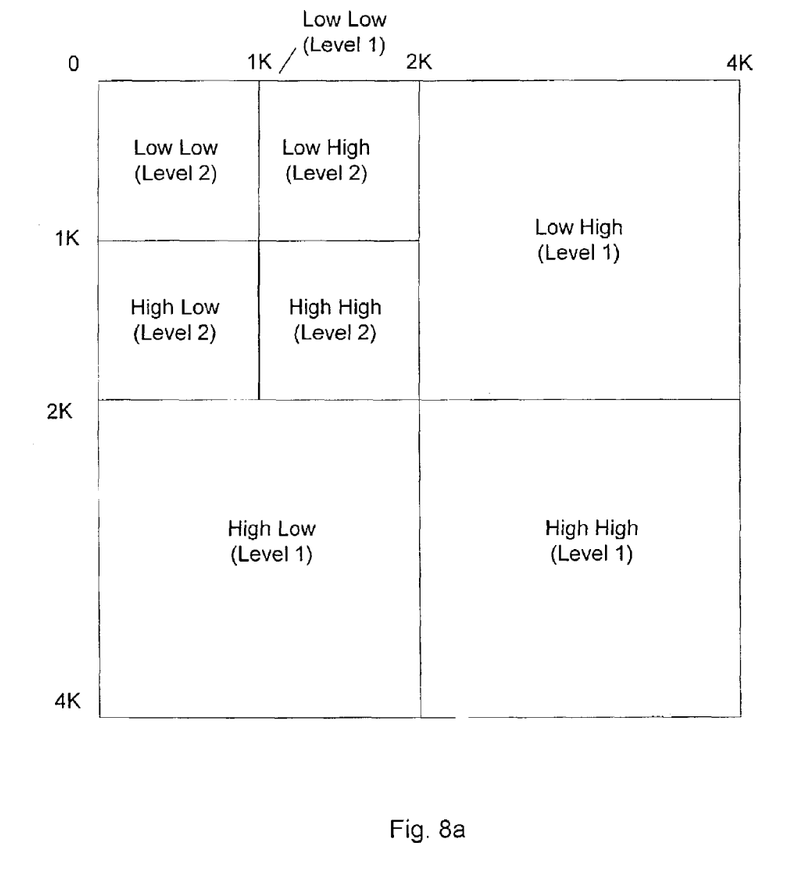
FIG. 8a illustrates an example of a pyramidal data structure.

FIG. 8a illustrates an example of a pyramidal data structure. For this example, the source image comprises a 4K×4K image. The decomposition processing 120 generates, in a first iteration, a level one Mallat structure. Specifically, as shown in FIG. 8a, a low-pass component, "low low", is generated and consists of a 2K×2K sub-image. The 2K×2K sub-image is labeled in FIG. 8a as 305. The high-pass components, consisting of "low high", "high high", and "high low", contain physical coefficient coordinates (e.g., the upper right hand coordinate for the rectangle that constitutes the "low high" component is (4K, 0)).

Figure 8B:
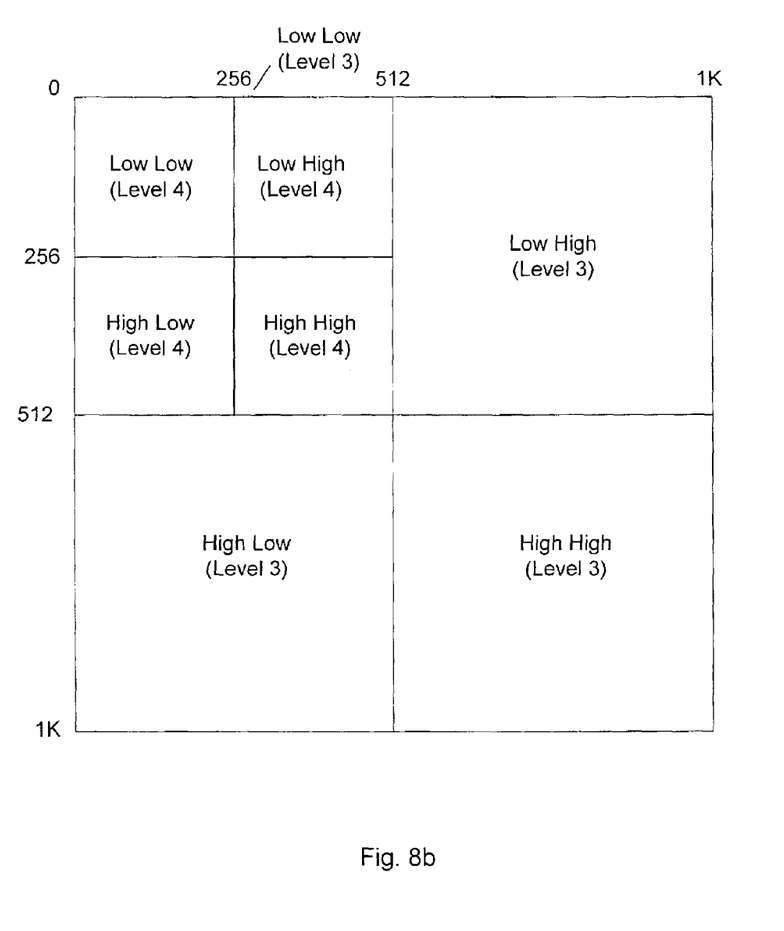

FIG. 8a also illustrates a second level decomposition. The second iteration of decomposition processing 120 operates on the low pass (i.e., "low low"), component of the level one data. For the second level, the low-pass component, "low low", consists of a 1K×1K sub-image, as labeled in FIG. 8a. FIG. 8b illustrates level three and level four decompositions for the 4K×4K source image of FIG. 8a. To generate the level three decomposition, decomposition processing 120 operates on the level two "low low" component (i.e., the 1K×1K image). For the level three transform, the low-pass component, "low low", is a 512×512 sub-image as labeled on FIG. 8a. FIG. 8b also illustrates a fourth level of decomposition for the 4K×4K source image. For the level four transform, the low-pass component comprises a sub-image of 256×256 pixels.

In one embodiment, the wavelet kernel utilized is derived from D. LeGall and A. Tabatabai, (See "Sub-band coding of digital images using symmetric short kernel filters and arithmetic coding techniques," IEEE International Conference on Acoustics, Speech and Signal Processing, New York, N.Y., pp. 761–765, 1988). Any sub-band kernel or pyramid transform could be used within the infrastructure described by dynamic transfer syntax; however, an integer kernel with no coefficient growth in the low pass term has particular advantages in that the low pass coefficients can be used without processing as pixels, and the transform can be inverted exactly in the integer domain. Although floating point kernels can have superior signal transfer characteristics, the additional processing required to use these coefficients as pixels, and the need for additional storage to guarantee perfect reconstruction works to their disadvantage.

The kernel consists of a low pass and a high pass biorthogonal filter. With input defined as $\{d_j\}$ and [x] defined as the floor function, the forward transform is:

$$\text{Low}[j]=[(d_{2j}+d_{2j+1})/2]$$

$$\text{High}[2j]=d_{2j}-d_{2j+1}+\text{Poly}[j]$$

$$\text{Poly}[j]=[(3*\text{Low}[j-2]-22*\text{Low}[j-1]+22*\text{Low}[j+1]-3*\text{Low}[j+2]+32)/64]$$

The inverse transform, used to reconstruct the image, is:

$$d_{2j}=\text{Low}[j]+[(\text{High}[j]-\text{Poly}[j]+1)/2]$$

$$d_{2j+1}=\text{Low}[j]-[(\text{High}[j]-\text{Poly}[j])/2]$$

A more complete description of the spatial transform is contained in U.S. Provisional Patent Application, entitled "Flexible Representation and Interactive Image Data Delivery Protocol", Ser. No. 60/091,697, inventors Paul Joseph Chang and Carlos Bentancourt, filed Jul. 3, 1998, and U.S. Patent Application, entitled "Methods and Apparatus for Dynamic Transfer of Image Data", Ser. No. 09/339,077, inventors Paul Joseph Chang and Carlos Bentancourt, filed Jun. 23, 1999, both of which are expressly incorporated herein by reference.

Although the present invention has been described in terms of specific exemplary embodiments, it will be appreciated that various modifications and alterations might be made by those skilled in the art without departing from the spirit and scope of the invention.

What is claimed is:

1. A method for transferring source data from a server to a client, said method comprising the steps of:
   generating, from said source data, transform data comprising spatially related coefficients such that a block of coefficients permit reconstruction of identifiable portions of said source data;
   generating, at a client, a request for at least a portion of said source data, said request defining a block of said coefficients and at least one quantization value;
   transferring, from said client to a server, said request;
   extracting, at said server, transform data defined by said request;
   quantizing, at said server, transform data in accordance with said quantization value to generate quantized transform data, where quantizing, at said server, further includes quantizing a block of coefficients by quantization bin widths, $Q_i$, where the quantization bin width $Q_i$ are generated at the client to optimally minimize any distortion introduced by the quantization process while minimizing the data rate, and where the request for at least a portion of said source data further defines the quantization bin widths $Q_i$;
   compressing said quantized transform data to generate compressed data;
   transferring, from said server to said client, said compressed data;
   decompressing, at said client, said compressed data to generate quantized data;
   de-quantizing said quantized data to generate transform data; and
   reconstructing said source data at said client from said transform data.

2. The method as set forth in claim 1, wherein said source data comprises a source image.

3. The method as set forth in claim 2, wherein said source image comprises a medical image.

4. The method of claim 1, where the at least one quantization value is a function of a rate at which the client can send data to the server.

5. A computer readable medium comprising a plurality of instructions, which when executed by a computer, causes the computer to perform the steps of:
   generating, from said source data, transform data comprising spatially related coefficients such that a block of coefficients permit reconstruction of identifiable portions of said source data;
   generating, at a client, a request for at least a portion of said source data, said request defining a block of said coefficients and at least one quantization value;
   transferring, from said client to a server, said request;
   extracting, at said server, transform data defined by said request;
   quantizing, at said server, transform data in accordance with said quantization value to generate quantized transform data, where quantizing, at said server, further includes quantizing a block of coefficients by quantization bin widths, $Q_i$, where the quantization bin widths $Q_i$ are generated at the client to optimally minimize any distortion introduced by the quantization process while minimizing the data rate, and where the request for at least a portion of said source data further defines the quantization bin widths $Q_i$;
   compressing said quantized transform data to generate compressed data;
   transferring, from said server to said client, said compressed data;
   decompressing, at said client, said compressed data to generate quantized data;
   de-quantizing said quantized data to generate transform data; and
   reconstructing said source data at said client from said transform data.

6. The computer readable medium as set forth in claim 5, wherein said source data comprises a source image.

7. The computer readable medium as set forth in claim 6, wherein said source image comprises a medical image.

8. The computer readable medium of claim 5, where the at least one quantization value is a function of a rate at which the client can send data to the server.

9. A method for processing, at a server, data for display at a client, said method comprising the steps of:
   generating, from said source data, transform data comprising spatially related coefficients such that a block of coefficients permit reconstruction of identifiable portions of said source data;
   receiving, from a client, a request for at least a portion of said source data, said request defining a block of said coefficients and at least one quantization value;
   extracting transform data defined by said request;
   quantizing, at said server, transform data in accordance with said quantization value to generate quantized transform data, where quantizing, at said server, further includes quantizing a block of coefficients by quantization bin widths, $Q_i$, where the quantization bin widths $Q_i$ are generated at the client to optimally minimize any distortion introduced by the quantization process while minimizing the data rate, and where the request for at least a portion of said source data further defines the quantization bin widths $Q_i$;
   compressing said quantized transform data to generate compressed data; and
   transferring, to said client, said compressed data.

10. The method of claim 9, where the at least one quantization value is a function of a rate at which the client can send data to the server.

* * * * *